April 3, 1956  E. H. LAND  2,740,343
PHOTOGRAPHIC APPARATUS EMBODYING PROCESSING MEANS
Filed Oct. 22, 1954  2 Sheets-Sheet 1

INVENTOR
Edwin H. Land
BY Brown and Mikulka
ATTORNEYS

April 3, 1956          E. H. LAND          2,740,343

PHOTOGRAPHIC APPARATUS EMBODYING PROCESSING MEANS

Filed Oct. 22, 1954          2 Sheets-Sheet 2

INVENTOR
Edwin H. Land

BY Brown and Mikulka
ATTORNEYS

United States Patent Office 2,740,343
Patented Apr. 3, 1956

2,740,343

PHOTOGRAPHIC APPARATUS EMBODYING PROCESSING MEANS

Edwin H. Land, Cambridge, Mass., assignor to Polaroid Corporation, Cambridge, Mass., a corporation of Delaware Application October 22, 1954, Serial No. 463,886

18 Claims. (Cl. 95—13)

This invention relates to photography and, more particularly, to a novel, self-developing camera for use with a film unit including a photosensitive element, a second element and means containing a processing composition. The camera includes means for exposing the photosensitive element to actinic light and predeterminedly processing the photosensitive element by spreading the processing composition in a thin layer between the photosensitive element and the second element. While the second element, for example, may merely aid in spreading the processing composition in a uniform layer on the photosensitive element, in a preferred form of film unit it serves as an image-receptive element or support for a positive print, the latter being formed by diffusion transfer reversal. The herein described camera is generally similar to the camera described and claimed in the copending application of Edwin H. Land, Serial No. 463,848, filed October 22, 1954.

An object of the present invention is to provide, in a camera of the above type, means for spreading a processing composition in a thin layer between the photosensitive and second element, said spreading means being movable into and out of operative position, and means responsive to the movement of the film unit through the aforementioned passage for selectively positioning said spreading means.

Another object of the present invention is to provide, in a camera of the above type, means associated with said passage for spreading said processing composition during movement of said film unit through said passage into exposure position and means responsive to said movement for rendering said spreading means inoperative when said film unit is in exposure position.

A further object of the present invention is to provide, in a camera of the above type, means for positioning said spreading means out of operative position during movement of said film unit through said passage into exposure position, and means responsive to the movement of said film unit into exposure position for operatively positioning said spreading means when said film unit is in exposure position whereby said processing composition may be spread between said photosensitive and second elements during withdrawal of said film unit from said camera housing through said passage.

Still a further object of the present invention is to provide, in a camera of the above type, spreading means normally urged into inoperative position, means responsive to the movement of said film unit into exposure position for operatively positioning said spreading means when said film unit is in exposure position, and means retaining said spreading means in operative position as long as a portion of said film unit is within said passage.

Other objects of the invention will in part be obvious and will in part appear hereinafter.

The invention accordingly comprises the apparatus possessing the construction, combination of elements and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
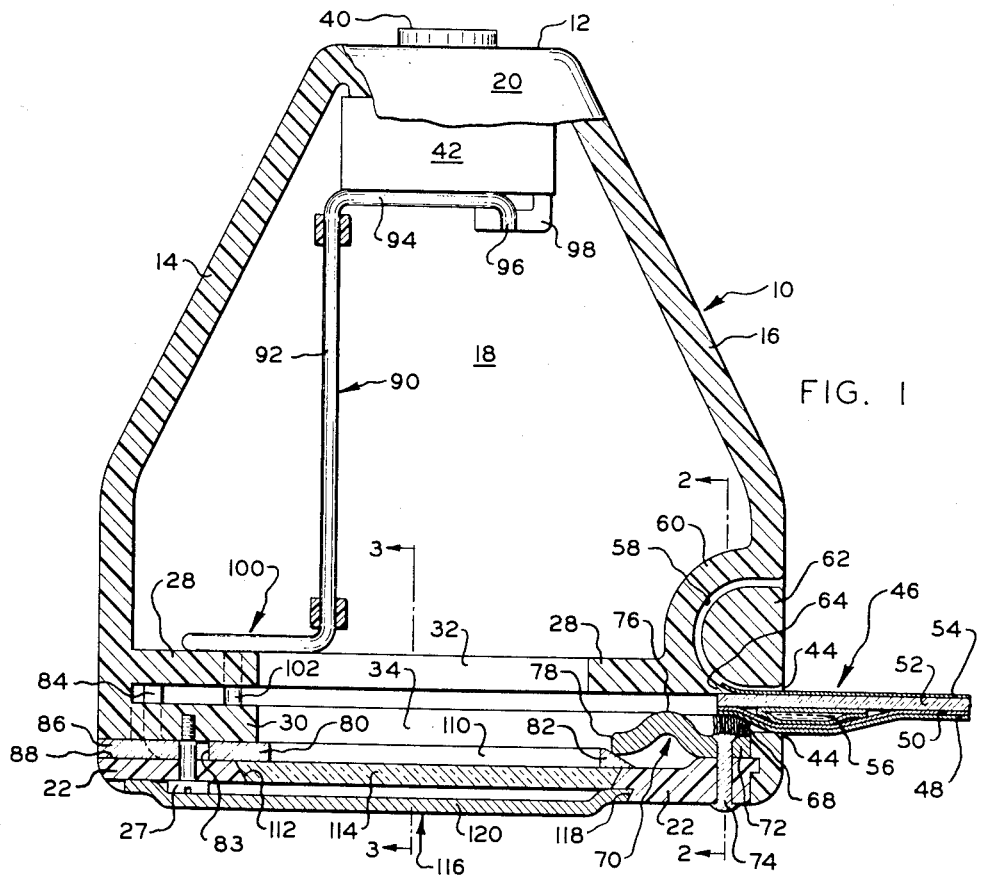
Figure 1 is an enlarged plan view, with parts broken away and partially in section, of a camera embodying the present invention, illustrated together with an embodiment of a film unit, also in section, adapted for use with the camera.
Figure 2:
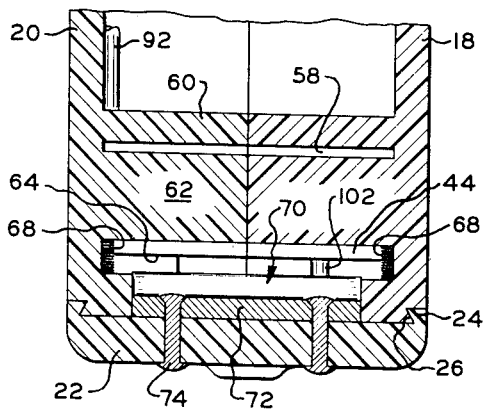
Fig. 2 is a sectional view taken substantially along the line 2—2 of Fig. 1.

Generally, the invention contemplates the provision of a novel, inexpensive, compact, box-type camera capable of making a single exposure of the photosensitive element of a film unit when the latter is inserted into the camera through a passage and of processing the film unit to form a finished photographic print, preferably a positive transparency. The camera is relatively small, being preferably only sufficiently large to produce a transparency, for example of 35 mm. size, and is simple in its operation, requiring only that the operator insert a film unit into a passage in the camera housing until it comes to rest in exposure position and then withdrawing the film unit from the housing following exposure. The film unit includes a photosensitive element, a second or image-receptive element and means containing a liquid processing composition. The camera includes means for spreading the processing liquid from the containing means in a thin layer so as to permeate the photosensitive and image-receptive elements during movement of the film unit through the passage. The spreading means may be operative to spread the processing liquid during withdrawal of the film unit from the camera following exposure. In a preferred form of the camera, the processing liquid is spread as the film unit is moved through the passage into exposure position, and means, preferably responsive to the movement of the film unit, are provided for exposing the photosensitive element immediately as it comes to rest in exposure position whereupon the processing liquid develops the latent image in the photosensitive element and forms a print of the image on the image-receptive element. Following exposure of the photosensitive element, the film unit may be withdrawn from the camera at once or, if the processing liquid has been spread prior to exposure, the film unit may be withdrawn at the end of a predetermined processing period. After withdrawal from the camera and the lapse of a predetermined processing period, the photosensitive and second elements are stripped apart.

The herein disclosed camera is further adapted without modification for immediate use as a viewer for positive transparencies produced thereby or may be coupled with a suitable light source to provide a satisfactory projector for the same transparencies.

Referring now to Figs. 1 through 4 of the drawings, there is illustrated one form of camera embodying the present invention, together with a film unit adapted for use with the camera. For purposes of illustration, the camera and film unit have been shown as somewhat enlarged and the thickness of the materials comprising the film unit greatly exaggerated for clarity. The camera comprises a generally rectangular housing 10 including a relatively short front wall 12, two side walls 14 and 16, having rear portions parallel to each other and substantially perpendicular to front wall 12 and front portions which are convergent, a bottom wall 18 and a top wall 20, the greater portion of which is illustrated as broken away in order to show the other components of the camera. Housing 10 includes a rear wall 22, preferably removable from the housing to provide for access to the interior of said housing and, so that it may be removably secured to housing 10 in a lighttight fashion, rear wall 22 is provided with dependent flanges 24 having angular grooves adapted to engage corresponding angular portions of shoulders 26 on the rear portion of side wall 14, bottom wall 18 and top wall 20. Means such as a screw 27 may be provided for securing rear wall 22 so that it is movable with respect to the other portions of the camera housing.

Means are provided for guiding a film unit into position for exposure and, in the form shown, comprise a pair of parallel intermediate guide walls 28 and 30 predeterminedly spaced apart to permit movement of a film unit between their adjacent surfaces. Guide wall 30 is positioned adjacent the rear of housing 10, and wall 28 is positioned forwardly of wall 30. Wall 28 is provided with a rectangular exposure aperture, designated at 32, through which actinic light may be transmitted to a film unit positioned for exposure between guide walls 28 and 30. Guide wall 30 includes a rectangular aperture 34 generally corresponding to aperture 32 in wall 28 but having only one side portion adjacent side wall 14 and top and bottom longitudinal marginal portions which extend to side wall 16 to provide means for guiding a film unit into exposure position. Side wall 16 of the camera housing is provided with an opening associated with guide walls 28 and 30 and forming in conjunction therewith a passage, indicated at 44, through which a film unit 46 may be moved into position for exposure within housing 10.

For exposing the photosensitive element of a film unit positioned between guide walls 28 and 30, there are provided means such as a lens 40 and shutter mechanism 42 mounted on front wall 12. Lens 40, for example, may be of a fixed focus or of any conventional design including manually operable control means for varying its focus, and shutter mechanism 42 is of any suitable conventional design and may include, for example, means (not shown) permitting manual operation as well as adjustment of exposure speed. The camera may also include a view finder mounted on the exterior of the housing, for example, on upper wall 20.

Film unit 46 is illustrated in Fig. 1 with its end portion inserted into passage 44 in position to be moved through the passage into exposure position and is preferably a substantially rigid or inflexible, multilayer assemblage comprising an outer lighttight envelope including an opaque rear cover sheet 48 and a front cover sheet 54 composed, for example, of a flexible opaque paper, a photosensitive element 50, a second or image-receptive element 52 and a rupturable container 56 carrying a liquid composition capable of processing the photosensitive element. To render the edges of the film unit lighttight, rear cover sheet 48 may include longitudinal edge portions extending around the edges of the film unit and joining with front cover sheet 54. Front cover sheet 54 is adapted to be stripped from the film unit within the lighttight environment of the camera housing and, for this purpose, is adhered at its longitudinal edge portions to second element 52 by some suitable material which is readily strippable and, in a preferred form, by a pressure-sensitive adhesive permitting sheet 54 to be readhered to the film unit in a lighttight manner during withdrawal from the camera.

Photosensitive element 50 of film unit 46 includes a layer of photosensitive material, preferably an emulsion of silver halide, in which a latent image may be obtained by differential exposure to actinic light cast on a suitable support or backing. Second element 52, superposed with photosensitive element 50, is adatped to serve as a support for an image-receptive layer in which a visible print of a latent image in the photosensitive layer may be produced. Rupturable container 56, carrying a processing liquid, is mounted adjacent one end of the film unit between the photosensitive and image-receptive elements, and the photosensitive element is adapted to be processed by advancing the film unit between a pair of pressure-applying members in order to rupture container 56 and spread the processing composition between the photosensitive and image-receptive layers of elements 50 and 52. An alternative construction of film unit, disclosed in Patent No. 2,661,293, issued December 1, 1953, to Edwin H. Land for Process of Producing a Colored Photographic Image by Means of Exhaustion of Developer, comprises an image-receptive layer on a support and a photosensitive layer on the image-receptive layer. In this form of film unit, a separate photosensitive element is unnecessary and a container for the processing liquid is mounted between cover sheet 48 and support element 52 in position to discharge its liquid contents on the surface of the photosensitive layer adjacent cover sheet 48, the latter being formed of an opaque liquid-impermeable material.

In the form of film unit shown in Fig. 1, photosensitive element 50 is adapted to be exposed through image-receptive element 52, making it essential that at least the portion of element 52 overlying the area of the photosensitive element to be exposed is transparent, while photosensitive element 50 and the margins of element 52 are preferably opaque to aid in rendering the film unit lighttight along its edges. It is important that the film unit have sufficient structural strengh and rigidity to permit its being manually inserted into passage 44 and, during movement into exposure position, to pass between pressure-applying means for spreading the processing liquid to actuate or deactuate the spreading means and to engage and render operative means for making an exposure. These features, together with the provision of an attractive, inflexible mount for a positive photographic print, preferably a transparency, may be realized by casting the image-receptive layer of image-receptive element 52 on a suitable inflexible, transparent material substantially thicker than the other elements comprising the unit, glass and transparent organic plastic material being suitable for this purpose.

The processing composition, when spread in a uniformly thin layer between elements 50 and 52, preferably effectuates a silver halide diffusion-transfer reversal process by which a latent image in element 50 is developed and a positive print is produced in element 52. Examples of photographic materials useful in processes of the foregoing type are described in detail in Patent No. 2,543,181, issued to Edwin H. Land on February 27, 1951, for Photographic Product Comprising a Rupturable Container Carrying a Photographic Processing Liquid and in Patent No. 2,647,056, issued to Edwin H. Land on July 28, 1953 for One-Step Photographic Transfer Process.

It is understood that the processing composition need not effectuate a diffusion-transfer reversal process but may act merely to develop the latent image in element 50 or a latent image in element 52 when the latter is provided with a stratum of photosensitive material. In this case, the nonphotosensitive element acts merely to spread the composition upon the photosensitive element. Where element 52 is photosensitive, element 50 may be omitted if cover sheet 48 itself is effective to spread the composition upon element 52. While the film unit has been described as comprising materials capable of effecting a silver halide diffusion-transfer reversal process, it is to be understood that the film unit may also include photosensitive ferric compounds with a processing composition which includes suitable couplers, diazonium compounds, which decompose when photoexposed, together with suitable developers which include couplers capable of forming dyes, or materials capable of becoming differentially insolubilized or tanned when photoexposed.

Means are provided for separating or stripping front cover sheet 54 from film unit 46 as the latter moves through passage 44 in order to permit exposure of the photosensitive element within the camera housing. This stripping means includes a narrow curved passage 58 which leads from passage 44 to the exterior of housing 10 and is defined by curved portion 60 of wall 28 and another member 62 having an inner curved surface which is substantially parallel to the outer surface of wall portion 60. Wall portion 60 and member 62 extend between the top and bottom walls of the camera housing to form passage 58 between their adjacent surfaces, the passage being only sufficiently wide to permit the free movement of cover sheet 54 therethrough. The passage is curved so as to guide cover sheet 54 exteriorly of wall 16 of the housing as it is stripped from element 52, and to prevent the admission of light into the housing. To initially separate the leading end of sheet 54 from element 52 and guide the sheet through passage 58, wall portion 60 includes a wedge-shaped end portion 64 so positioned as to extend into the path of sheet 54 between said sheet and element 52. By virtue of the foregoing arrangement, cover sheet 54, in addition to being stripped from element 52 as film unit 46 is moved through passage 44 into exposure position, may be readhered to element 52 in a light-tight fashion as the film unit is withdrawn from the camera housing following exposure and before processing is complete. To facilitate this readherence, cover sheet 54, as heretofore mentioned, may be secured at its margins to element 52 by pressure-sensitive adhesive and the portions of the surface of wall portion 60 underlying the margins of cover sheet 54 as it moves through passage 58 may be recessed so as not to contact the adhesive on said margins. In another form of film unit, cover sheet 54 may be provided with a leader of sufficient length to extend through passage 58 to the exterior of housing 10 where it may be manually grasped by the operator in order to simultaneously move the film unit through passage 44 into exposure position and to strip sheet 54 from the film unit. To prevent light from leaking into the camera housing around the lateral edges of film unit 46 as it is moved through passage 44 and cover sheet 54 is stripped from element 52, passage 44 is provided with light-shielding means, such as felt pads 68, secured to bottom wall 18 and top wall 20 adjacent the open end of passage 44, these pads being adapted to engage the edges of the film unit as it moves through the passage.

Means are provided within housing 10 adjacent passage 44 for spreading the processing liquid from container 56 between elements 50 and 52 as film unit 46 is advanced through the passage into exposure position. This spreading means comprises a pressure-applying element 70 extending at least from top to bottom of exposure aperture 32 and so positioned that a portion of said element is interposed in the path of the film unit as the latter moves through passage 44. Pressure element 70 includes an end portion 72 at which it is secured to rear wall 22 by suitable means such as rivets 74, an intermediate engagement portion 76 curved away from rear wall 22 into the path of film unit 46, the other end portion 78 being free. Pressure element 70, formed of a resilient material, preferably a metallic material such as spring steel, beryllium copper or Phosphor bronze, is normally biased into inoperative position wherein engagement portion 76 does not extend into the path of the film unit. Means are provided for holding pressure element 70 in operative or pressure-applying position wherein engagement portion 76 of the pressure element 70 engages film unit 46 and compresses the latter as it is advanced between elements 70 and guide wall 28 in order to effect the spreading of the processing liquid from container 56 in a thin layer between photosensitive element 50 and image-receptive element 52.

The processing liquid is spread between the photosensitive and image-receptive elements during movement of the film unit into exposure position, the photosensitive element is immediately exposed and the film unit may then be withdrawn from the camera. Since the processing of the film unit is occurring during its removal from the camera, it is desirable that the pressure element does not engage the film unit during withdrawal of the latter from the camera to facilitate withdrawal and because it may disturb the processing. The aforementioned means for holding pressure element 70 in operative position during movement of a film unit into exposure position is responsive to movement of the film unit for rendering pressure element 70 inoperative when said film unit is in exposure position. This means includes a generally flat rectangular plate 80 slidably secured in a channel or recess in rear wall 22 between said wall and guide wall 30. Plate 80 includes a ramp or wedge-shaped end portion 82 adapted to engage free end 78 of pressure element 70 supporting the latter against its bias so that engagement portion 76 extends into the path of the film unit moving through passage 44. To render pressure element 70 inoperative, plate 80 may be moved toward wall 14 so that ramp 82 is disengaged from free end 78 of pressure element 70, thus permitting said element to return to its normally inoperative position. Plate 80 includes a slot 83 through which screw 27 extends, a pair of turned-up tabs 84 projecting through an opening in guide wall 30 into the path of a film unit positioned between said wall and guide wall 28 and an end portion 86 projecting through a passage 88 in side wall 14. During the latter portion of its movement into exposure position, the film unit is adapted to engage tabs 84 to move plate 80 toward wall 14, disengaging ramp portion 82 from free end 78 of pressure element 70 and to cause end 86 to project through passage 88 exteriorly of the housing. End portion 86 is manually engageable for moving plate 80 toward pressure element 70 to render said element operative prior to insertion of a film unit into the camera.

Figure 3:
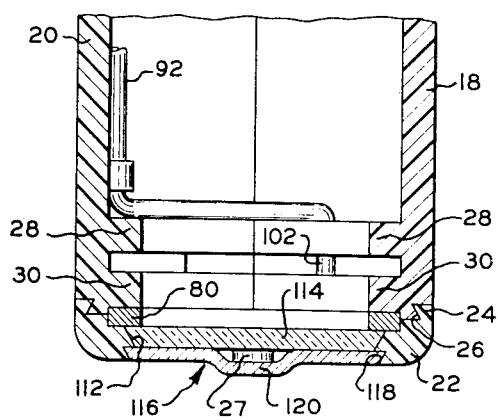
Fig. 3 is a sectional view taken substantially along the line 3—3 of Fig. 1.
Figure 4:
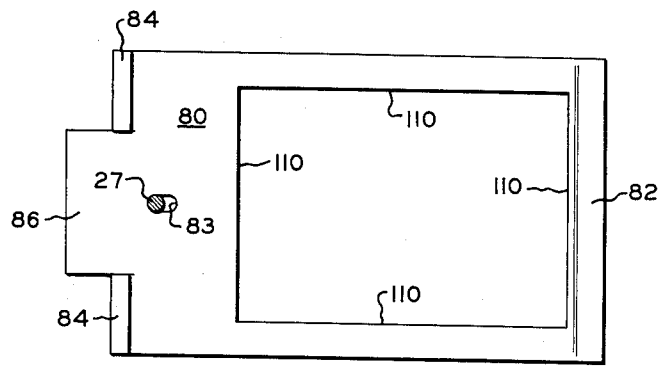
Fig. 4 is a plan view of an element of the camera of Fig. 1.

The spreading of the processing liquid during insertion of the film unit into the camera makes it desirable that the photosensitive element be exposed as soon as the film unit is in exposure position before processing of the photosensitive element has progressed to any appreciable extent. This immediate exposure is best effected by means responsive to the movement of the film unit into exposure position for automatically making the exposure after the film unit has come to rest in this position. These means include exposure means such as a shutter 42 and an elongated actuating arm 90 adapted to engage film unit 46 for rendering said shutter operative to expose the film unit. Arm 90, formed preferebly of a rigid round wire of sufficient diameter and strength to resist the strain of torsional forces to which it is subjected, includes an elongated straight central portion 92 at which it is secured for pivotal movement about its axis to or adjacent upper wall 20 of housing 10 with central portion 92 extending substantially from guide wall 28 to the housing of shutter 42 and perpendicular to guide wall 28. As shown in Figs. 1 and 3, arm 90 includes a first dependent end portion 94 adjacent shutter 42 extending at right angles from central portion 92 and having a substantially short dependent engagement portion 96 at its end adapted to engage an actuating lever 98 comprising the mechanism of shutter 42. The other end of arm 90 comprises a portion 100 extending at right angles from central portion 92 in a plane parallel to and adjacent guide wall 28. End portion 100 is bent at a right angle and includes a dependent engagement portion 102 extending parallel to central portion 92 into the passage between guide walls 28 and 30.

Arm 90 is so formed and mounted in housing 10 that when said arm is in inoperative position prior to engagement with and actuation by the film unit, end portion 94 lies substantially adjacent upper wall 20, end portion 100 extends angularly downward toward bottom wall 18 and engagement portion 102 projects through an elongated curved slot (not shown) in guide wall 28 at a point adjacent the end of exposure aperture 32. This slot is curved upward toward upper wall 20, the center of curvature of said slot being the axis of central portion 92, thereby permitting engagement portion 102 to move in said slot when arm 90 is pivoted about the aforementioned axis. As film unit 46 is moved between guide walls 28 and 30 toward side wall 14, the edge of said film unit engages engagement portion 102 of arm 90, pivoting the latter clockwise (as viewed from the rear of the camera) until end portion 100, formed with a right angle bend, is brought against side wall 14 and top wall 20. By virtue of the foregoing arrangement, the force exerted on the film unit in moving it toward wall 14 into exposure position is transmitted through arm 90 including end portion 94 and engagement portion 96 to actuating lever 98, causing the latter to move downward and actuate the shutter to expose the photosensitive element of the film unit.

While movement of the film unit into exposure position is effective to actuate the shutter for making the exposure, it is desirable that the exposure be delayed until this movement has completely ceased and the film unit is at rest in exposure position. This may be accomplished by providing a delay mechanism, actuated by movement of the film unit, operable to actuate the shutter following a predetermined time interval during which movement of the film unit into exposure position is completed. Both the shutter and the delay mechanism may be energized or cocked by movement of actuating lever 98, the latter portion of said movement setting in motion the delay mechanism which in turn trips or releases the shutter at some predetermined interval thereafter. Although movement of a film unit into exposure position is done manually, thereby making accurate control of the rate of said movement uncertain, it has been found that, for all practical purposes, a delay in the order of from 1/3 to 4/5 of a second is adequate to assure cessation of movement of the film unit prior to making an exposure. Suitable delay mechanisms such as an escapement device, for example a star wheel and pallet, or an inertia delay element are embodied in many conventional shutters and are well known in the art. Resilient means preferably incorporated into the shutter mechanism are provided for returning arm 90 to its initial position prior to exposure after removal of the film unit from the camera.

In order to adapt the herein disclosed camera to use as a viewer or projector, plate 80 includes a rectangular aperture 110 and rear wall 22 is provided with means permitting illumination of a positive photographic transparency positioned in passage 44 between guide walls 28 and 30. In the form shown, these means comprise an aperture 112 in rear wall 22 corresponding to exposure aperture 32 in guide wall 28 and aperture 110 in plate 80, a light-diffusing element 114 secured in aperture 112 and a slide plate 116 for closing said aperture to actinic light during exposure of a film unit in the camera. Slide plate 116 is generally flat and rectangular, being mounted in a channeled recess having inwardly divergent sides 118 in rear wall 22, sides 118 retaining said plate in closure position overlying diffusing element 114 but permitting plate 116 to be moved toward wall 14 out of closure position. Plate 116 includes a longitudinal dished or recessed section 120 adapted to clear the head of screw 27 extending through rear wall 22 between side wall 14 and aperture 112. Recessed section 120 does not extend completely from end to end of slide plate 116 and the marginal portions of the ends of plate 116 will not clear the head of screw 27. It is by virtue of this arrangement that plate 116 is prevented from being completely separated from the camera since it cannot be entirely withdrawn from the channeled recess in rear wall 22 in which it is retained.

To operate the camera, film unit 46 is inserted into passage 44 so that wedge-shaped portion 64 engages cover sheet 54, stripping the latter from image-receptive element 52 and guiding it through passage 58 as the film unit is advanced through passage 44 into exposure position between guide walls 28 and 30 by manual application of pressure on the film unit itself or by drawing cover sheet 54 or a suitable leader attached thereto as it extends through passage 58 exteriorly of the camera. As the film unit is moved between spreader 70 and guide wall 28, container 56 is ruptured and its liquid contents are spread in a thin layer between photosensitive element 50 and image-receptive element 52. The leading edge of the film unit engages portion 102 of arm 90, pivoting the latter and thereby actuating the delay mechanism which in turn operates the shutter after movement of the film unit has ceased, and then engages turned-up tabs 84 on plate 80, moving the latter toward wall 14 and rendering the spreading element inoperative. Following exposure, the film unit may be permitted to remain in the camera for a predetermined processing period and then removed from the camera and the photosensitive and image-receptive elements stripped apart; or, if it is desired to make several exposures in rapid succession, the film unit may be removed from the camera immediately following exposure, front cover sheet 54 being readhered to image-receptive element 52 in a light-tight fashion during withdrawal of the film unit from the camera and then, after a predetermined processing period has elapsed, the photosensitive and image-receptive elements may be stripped apart. Spreading element 70 may be moved into operative position after the film unit has been removed from the camera by manually pushing end portion 86 extending through side wall 14 toward side wall 16. The transparent image-receptive element supporting a positive image may then be viewed by inserting it into the camera housing in the same manner as the film unit is inserted for exposure. Slide 116 covering diffusing element 114 is withdrawn and for this purpose the shutter is provided with suitable means for holding it open to permit the operator to either view the transparency through the camera lens or to use the camera as a projector by providing a strong source of illumination behind the diffusing element.

Figure 5:
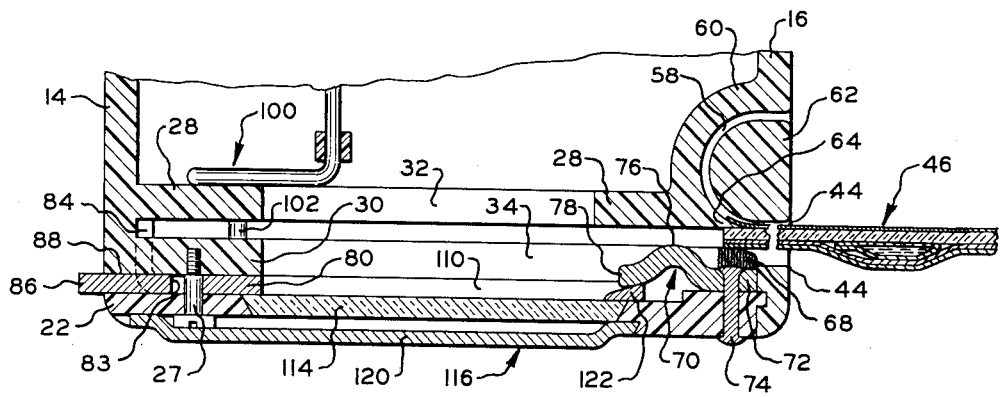
Fig. 5 is an enlarged plan view, with parts broken away and partially in section, of another camera embodying the present invention.

Referring now to Fig. 5 of the drawings, there is shown another camera embodying the present invention wherein the liquid processing composition is spread on the photosensitive element during withdrawal of said film unit from the camera housing following exposure, the camera including means responsive to the movement of the film unit into exposure position for operatively positioning liquid-spreading means when said film unit is in exposure position. The camera of Fig. 5 is substantially the same as that of Figures 1, 2 and 3, like numbers referring to like elements, and includes a housing 10, spreader element 70 and actuating plate 80 having turned-up tabs 84 and end portion 86 projecting through a passage 88 in side wall 14 of the housing and a rectangular aperture 110.

Spreader element 70 is so biased that normally engagement portion 76 does not extend into passage 44 in the path of a film unit positioned between guide walls 28 and 30 and, in this position, is inoperative to spread the processing composition on the photosensitive element. To operatively position spreader element 70, plate 80 includes an end portion 122 underlying free end 78 of element 70. End portion 122, defining one end of aperture 110, is thickest at its end and tapers toward aperture 110 to form a wedge which underlies engagement portion 76 of spreader element 70 when the latter is in inoperative position. When plate 80 is moved toward side wall 14, wedge-shaped end portion 122 engages free end 78 of element 70, moving the latter toward the front of the camera into operative position. Spreader element 70 is rendered operative during the latter portion of the movement of a film unit into exposure position, the end of the film unit engaging turned-up tabs 84 moving plate 80 toward wall 14. End portion 86 projects exteriorly of the camera when spreader element 70 is in operative position and may be manually engaged to move plate 80 toward side wall 16 and render said spreader element inoperative prior to withdrawal of the film unit from the camera.

Figure 6:
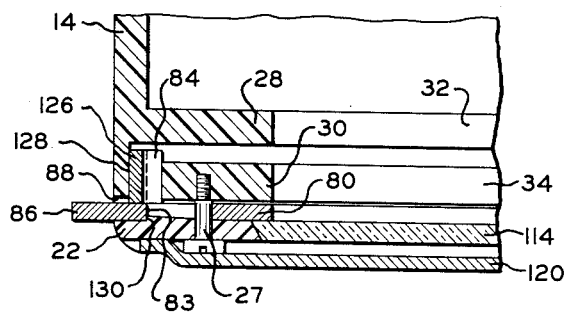
Fig. 6 is a view similar to Fig. 5 illustrating another embodiment of the present invention.

In another form of the camera illustrated in Fig. 6, spring means are provided for urging plate 80 toward side wall 16 in order to render spreader element 70 inoperative, together with means for retaining plate 80 in position against the bias of said spring means and means for releasing said plate from said retaining means. These means include a curved leaf spring 126 mounted in a recess 128 in side wall 14 so as to bear against tab 84 of plate 80. Plate 80 is substantially the same as illustrated in Fig. 5 except that slot 83 is substantially widened and elongated. Rear wall 22 of housing 10 includes an inclined raised portion ending in a sharp shoulder 130 underlying slot 83 of plate 80, the latter being adapted to ride over shoulder 130 when moved toward wall 14, shoulder 130 engaging the edge of slot 83 when said plate has been moved into operative position, holding said plate in said position against the bias of spring 126. The depth of passage 88 through which end portion 86 of plate 80 extends is somewhat greater than the thickness of said end portion so that the latter may be manually moved toward the front of a camera to deform plate 80 and disengage the edge of slot 83 from shoulder 130, thereby permitting plate 80 to move under the bias of spring 126 toward wall 16, thereby rendering spreader element 70 inoperative.

Since certain changes may be made in the above apparatus without departing from the scope of the invention herein involved, it is intended that all matter contained in the above description or shown in the accompanying drawings shall be interpreted as illustrative and not in a limiting sense.

What is claimed is:

1. A photographic apparatus wherein a photographic film unit is exposed and processed by a liquid composition releasably carried by the film unit, said apparatus comprising, in combination, a housing defining a lighttight chamber, exposure means associated with said housing, guide means within said housing for locating said film unit in position for exposure, a passage, in said housing adjacent said guide means, communicating with the exterior of said housing and adapted to receive said film unit, pressure-applying means mounted within said passage, said pressure-applying means having an operative position wherein it engages said film unit during movement of the latter through said passage and applies pressure to said film unit to effect the release of the processing liquid carried by said unit and the distribution of said liquid within said unit, and an inoperative position wherein said pressure-applying means is incapable of applying a liquid-releasing pressure to said film unit during movement of the latter through said passage, said pressure-applying means being movable from one of said positions to the other, and means, responsive to the movement of said film unit through said passage, for moving said pressure-applying means from one of said positions to the other.

2. A photographic apparatus wherein a photographic film unit is exposed and processed by a liquid composition releasably carried by the film unit, said apparatus comprising, in combination, a housing defining a lighttight chamber, exposure means associated with said housing, guide means within said housing for locating said film unit in position for exposure, a passage, in said housing adjacent said guide means, communicating with the exterior of said housing and adapted to receive said film unit, pressure-applying means mounted within said passage, said pressure-applying means having an engagement portion extending transversely of the path of movement of said film unit through said passage, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said pressure-applying means being movable from one of said positions to the other, and means, carried by said housing responsive to the movement of said film unit through said passage, cooperating with said pressure-applying means for moving said engagement portion from one of said positions to the other.

3. A photographic apparatus wherein a photographic film unit is exposed and processed by a liquid composition releasably carried by container means comprising a portion of the film unit and spread from said container means in a layer between elements of said film unit, said apparatus comprising, in combination, a housing defining a lighttight chamber, exposure means associated with said housing, guide means within said housing for locating said film unit in position for exposure, a passage, in said housing adjacent said guide means, communicating with the exterior of said housing and adapted to receive said film unit, pressure-applying means mounted within said passage, said pressure-applying means comprising a resilient element having an engagement portion extending transversely of the path of movement of said film unit through said passage, said engagement portion having an operative position wherein it engages said film unit during movement of the latter through said passage for applying pressure to said film unit to effect the release of the processing liquid carried by said unit and spread said liquid in a layer within said unit, and an inoperative position wherein said engagement portion is incapable of applying liquid-releasing pressure to said film unit during movement of the latter through said passage, said engagement portion of said resilient element being movable from one of said positions to the other, and means, responsive to the movement of said film unit through said passage, cooperating with said resilient element for moving said engagement portion from one of said positions to the other.

4. A photographic apparatus wherein a photographic film unit is exposed and processed by a liquid composition releasably carried by the film unit and distributed upon an element of said film unit, said apparatus comprising, in combination, a housing defining a lighttight chamber, exposure means associated with said housing, guide means within said housing for locating said film unit in position for exposure, a passage, in said housing adjacent said guide means, communicating with the exterior of said housing and adapted to receiving said film unit, pressure-applying means mounted within said passage, said pressure-applying means comprising a resilient element having an engagement portion extending transversely of the path of movement of said film unit through said passage, said engagement portion having an operative position wherein it engages said film unit during movement of the latter through said passage to apply pressure to said film unit for effecting the release of the processing liquid carried by said unit and the distribution of said liquid within said unit, and an inoperative position wherein said engagement portion is incapable of applying liquid-releasing pressure to said film unit during movement of the latter through said passage, said engagement portion of said resilient element being movable from one of said positions to the other by deforming said resilient element, and means, responsive to the movement of said film unit through said passage, cooperating with said resilient element for moving said engagement portion thereof from one of said positions to the other.

5. A photographic apparatus wherein an element of a photographic film unit is exposed and processed by a liquid composition releasably carried by the film unit and distributed upon said element, said apparatus comprising, in combination, a housing defining a lighttight chamber, exposure means associated with said housing, guide means within said housing for locating said film unit so that said element is in position for exposure, a passage, in said housing adjacent said guide means, communicating with the exterior of said housing and adapted to receive said film unit, pressure-applying means mounted within said passage, said pressure-applying means having an engagement portion extending transversely of the path of movement of said film unit through said passage, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said pressure-applying means being movable from one of said positions to the other, means normally urging said engagement portion into one of said positions, and means, carried by said housing, responsive to the movement of said film unit through said passage, and cooperating with said pressure-applying means to move said engagement portion from said one position to the other.

6. A photographic apparatus wherein a photographic film unit is exposed and processed by a liquid composition releasably carried by the film unit, said apparatus comprising, in combination, a housing defining a lighttight chamber, exposure means associated with said housing, guide means within said housing for locating said film unit in position for exposure, a passage, in said housing adjacent said guide means, communicating with the exterior of said housing and adapted to receive said film unit, pressure-applying means mounted within said passage, said pressure-applying means having an engagement portion extending transversely of the path of movement of said film unit through said passage, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said pressure-applying means being urged into one of said positions, positioning means for engaging said pressure-applying means for moving said engagement portion into the other of said positions, and means, responsive to the movement of said film unit through said passage, cooperating with said positioning means for disengaging the latter from said pressure-applying means to permit the movement of said engagement portion into said one position.

7. A camera wherein a liquid processing composition releasably carried by a film unit is distributed upon an element of said film unit and said element is exposed immediately thereafter, said camera comprising, in combination, a housing defining a lighttight chamber, exposure means associated with said housing, guide means within said housing for locating said film unit so that said element is in position for exposure, a passage, in said housing adjacent said guide means, communicating with the exterior of said housing and adapted to receive said film unit, pressure-applying means mounted within said passage, said pressure-applying means having an engagement portion extending transversely of the path of movement of said film unit through said passage, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said pressure-applying means being movable from one of said positions to the other and normally being disposed in said operative position, resilient means for urging said engagement portion into said operative position, and means, responsive to the movement of said film unit through said passage into exposure position, cooperating with said pressure-applying means for moving said engagement portion thereof from operative position to inoperative position when said film unit is in exposure position.

8. A camera wherein a photosensitive element of a film unit is exposed and thereafter processed by a liquid composition releasably carried by the film unit, said camera comprising, in combination, a housing defining a lighttight chamber, exposure means associated with said housing, guide means within said housing for locating said film unit so that the photosensitive element thereof is in position for exposure, a passage, in said housing adjacent said guide beans, communicating with the exterior of said housing and adapted to receive said film unit, pressure-applying means mounted within said passage, said pressure-applying means having an engagement portion extending transversely of the path of movement of said film unit through said passage, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said pressure-applying means being movable from one of said positions to the other and normally being urged into said inoperative position, and means, responsive to the movement of said film unit through said passage into exposure position, cooperating with said pressure-applying means for moving said engagement portion from said inoperative position to said operative position when said film unit is in exposure position.

9. A camera wherein liquid processing composition is releasably carried by a photographic film unit and is distributed upon an element of said film unit and said element is exposed immediately thereafter, said camera comprising, in combination, a housing defining a lighttight chamber, exposure means associated with said housing, guide means within said housing for locating said film unit so that said element is in position for exposure, a passage, in said housing adjacent said guide means, communicating with the exterior of said housing and adapted to receive said film unit, pressure-applying means mounted within said passage, said pressure-applying means having an engagement portion extending transversely of the path of movement of said film unit through said passage, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said pressure-applying means being movable from one of said positions to the other, resilient means normally urging said engagement portion into inoperative position, positioning means for engaging and retaining said engagement portion in operative position, and means, responsive to the movement of said film unit through said passage into exposure position, cooperating with said positioning means for disengaging the latter from said engagement portion to permit the same to move into inoperative position when said film unit is in exposure position.

10. A camera wherein a photosensitive element of a film unit is exposed and thereafter processed by a liquid composition releasably carried by the film unit, said camera comprising, in combination, a housing defining a lighttight chamber, exposure means associated with said housing, guide means within said housing for locating said film unit so that the photosensitive element thereof is in position for exposure, a passage, in said housing adjacent said guide means, communicating with the exterior of said housing and adapted to receive said film unit, pressure-applying means mounted within said passage, said pressure-applying means having an engagement portion extending transversely of the path of movement of said film unit through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said pressure-applying means being movable from one of said positions to the other, means urging said engagement portion into inoperative position, positioning means for engaging said pressure-applying means and retaining said engagement portion in operative position, and means, responsive to the movement of said film unit through said passage into exposure position, cooperating with said positioning means for disengaging the latter from said pressure-applying means to permit the movement of said engagement portion thereof into operative position when said film unit is in exposure position.

11. A camera wherein a photosensitive element of a film unit is exposed and thereafter processed by a liquid composition releasably carried by the film unit, said camera comprising, in combination, a housing defining a lighttight chamber, exposure means associated with said housing, guide means within said housing for locating said film unit with the photosensitive element thereof in position for exposure, a passage, in said housing adjacent said guide means, communicating with the exterior of said housing and adapted to receive said film unit, pressure-applying means mounted within said passage, said pressure-applying means comprising a resilient element mounted out of the path of movement of said film unit through said passage and having an engagement portion extending transversely of said path of movement, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said resilient element being normally biased into one of said positions and movable from said one position to the other by deforming said element, and means, responsive to the movement of said film unit through said passage, cooperating with said resilient element for moving said engagement portion from one of said positions to the other.

12. A camera wherein a photosensitive element of a film unit is exposed and thereafter processed by a liquid composition releasably carried by the film unit, said camera comprising, in combination, a housing defining a lighttight chamber, exposure means associated with said housing, guide means within said housing for locating said film unit with the photosensitive element thereof in position for exposure, a passage, in said housing adjacent said guide means, communicating with the exterior of said housing and adapted to receive said film unit, pressure-applying means mounted within said passage, said pressure-applying means comprising a resilient element mounted out of the path of movement of said film unit through said passage and having an engagement portion extending transversely of said path of movement, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said unit during movement of the latter through said passage, said resilient element being normally biased into one position and movable from said one position into the other by deforming said element, positioning means for engaging said resilient element and moving said engagement portion thereof into the other of said positions, and means, responsive to the movement of said film unit, cooperating with said positioning means for disengaging the latter from said resilient element to permit the movement of said engagement portion under its own bias into said one position.

13. A camera wherein a photosensitive element of a film unit is exposed and thereafter processed by a liquid composition releasably carried by the film unit, said camera comprising, in combination, a housing defining a lighttight chamber, exposure means associated with said housing, guide means within said housing for locating said film unit so that the photosensitive element thereof is in position for exposure, a passage, in said housing adjacent said guide means, communicating with the exterior of said housing and adapted to receive said film unit, pressure-applying means mounted within said passage, said pressure-applying means comprising a resilient element having an engagement portion extending transversely of the path of movement of said film unit through said passage, said engagement portion having an operative position wherein it engages said film unit during movement of the latter through said passage to apply pressure to said film unit for effecting the release of the processing liquid carried by said unit and the distribution of said liquid within said unit, and an inoperative position wherein said engagement portion is incapable of applying liquid-releasing pressure to said film unit during movement of the latter through said passage, said engagement portion of said resilient element being normally biased into inoperative position and movable from said inoperative position into operative position by deforming said element, and means responsive to the movement of said film unit through said passage for deforming said element to position said engagement portion of said resilient element into operative position.

14. A camera wherein a liquid processing composition releasably carried by a film unit is distributed upon the photosensitive element of the film unit and said photosensitive element is exposed immediately thereafter, said camera comprising, in combination, a housing defining a lighttight chamber, exposure means associated with said housing, guide means within said housing for locating said film unit so that the photosensitive element thereof is in position for exposure, a passage, in said housing adjacent said guide means, communicating with the exterior of said housing and adapted to receive said film unit, pressure-applying means mounted within said passage, said pressure-applying means comprising a resilient element having an engagement portion extending transversely of the path of movement of said film unit through said passage, said engagement portion having an operative position wherein it engages said film unit during movement of the latter through said passage to apply pressure to said film unit for effecting the release of the processing liquid carried by said unit and the distribution of said liquid within said unit, and an inoperative position wherein said engagement portion is incapable of applying liquid-releasing pressure to said film unit during movement of the latter through said passage, said engagement portion of said resilient element being normally biased into operative position and movable from said operative position into inoperative position by deforming said element, and means responsive to the movement of said film unit through siad passage for deforming said element to move said engagement portion into operative position.

15. A camera wherein a liquid processing composition releasably carried by a film unit is distributed upon the photosensitive element of said film unit and said photosensitive element is exposed immediately thereafter, said camera comprising, in combination, a housing defining a lighttight chamber, exposure means associated with said housing, guide means within said housing for locating said film unit with the photosensitive element thereof in position for exposure, a passage, in said housing adjacent said guide means, communicating with the exterior of said housing and adapted to receive said film unit, pressure-applying means mounted within said housing, said pressure-applying means comprising a resilient element mounted out of the path of movement of said film unit through said passage and having an engagement portion extending transversely of said path of movement, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said resilient element being movable from one of said positions to the other and normally being biased into said operative position, and means, responsive to the movement of said film unit through said passage into exposure position, cooperating with said resilient element for moving said engagement portion thereof from operative position to inoperative position when said film unit is in exposure position.

16. A camera wherein a photosensitive element of a film unit is exposed and thereafter processed by a liquid composition releasably carried by the film unit, said camera comprising, in combination, a housing defining a lighttight chamber, exposure means associated with said housing, guide means within said housing for locating said film unit so that the photosensitive element thereof is in position for exposure, a passage, in said housing adjacent said guide means, communicating with the exterior of said housing and adapted to receive said film unit, pressure-applying means mounted within said passage, said pressure-applying means comprising a resilient element having an engagement portion extending transversely of the path of movement of said film unit through said passage, said engagement portion having an operative position wherein it engages said film unit during movement of the latter through said passage to apply pressure to said film unit for effecting a release of the processing liquid carried by said unit and the distribution of said liquid within said unit, and an inoperative position wherein said engagement portion is incapable of applying liquid-releasing pressure to said film unit during movement of the latter through said passage, said engagement portion of said resilient element being movable from one of said positions to the other and normally being urged into inoperative position, and means, responsive to the movement of said film unit through said passage into exposure position, cooperating with said resilient element for moving said engagement portion of said resilient element from inoperative to operative position when said film unit is in exposure position.

17. A camera wherein a liquid processing composition releasably carried by a film unit is distributed upon the photosensitive element of said film unit and said photosensitive element is exposed immediately thereafter, said camera comprising, in combination, a housing defining a lighttight chamber, exposure means associated with said housing, guide means within said housing for locating said film unit with the photosensitive element thereof in position for exposure, a passage, in said housing adjacent said guide means, communicating with the exterior of said housing and adapted to receive said film unit, pressure-applying means mounted within said housing, said pressure-applying means comprising a resilient element mounted out of the path of movement of said film unit through said passage and having an engagement portion extending transversely of said path of movement, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing presure to said film unit during movement of the latter through said passage, said engagement portion of said resilient element being movable from one of said positions to the other and normally being biased into inoperative position, positioning means for engaging and retaining said engagement portion in operative position, and means, responsive to the movement of said film unit through said passage into exposure position, cooperating with said positioning means for disengaging the latter from said engagement portion to permit the same to move into inoperative position when said film unit is in exposure position.

18. A camera wherein a photosensitive element of a film unit is exposed and thereafter processed by a liquid composition releasably carried by the film unit, said camera comprising, in combination, a housing defining a lighttight chamber, exposure means associated with said housing, guide means within said housing for locating said film unit with the photosensitive element thereof in position for exposure, a passage, in said housing adjacent said guide means, communicating with the exterior of said housing and adapted to receive said film unit, pressure-applying means mounted within said passage, said pressure-applying means comprising a resilient element mounted out of the path of movement of said film unit through said passage and having an engagement portion extending transversely of said path of movement, said engagement portion having an operative position wherein it engages said film unit during movement of the latter through said passage and applies pressure to said film unit to effect the release of the processing liquid carried by said unit and the distribution of said liquid within said unit, and an inoperative position wherein said engagement portion is incapable of applying liquid-releasing pressure to said film unit during movement of the latter through said passage, said engagement portion of said resilient element being movable from one of said positions to the other and normally being biased into inoperative position, positioning means for engaging said resilient element and retaining said engagement portion thereof in operative position, and means, responsive to the movement of said film unit through said passage into exposure position, cooperating with said positioning means for disengaging the latter from said resilient element to permit the movement of said engagement portion thereof into operative position when said film unit is in exposure position.

No references cited.